(12) United States Patent
Ehmann et al.

(10) Patent No.: US 11,368,007 B2
(45) Date of Patent: Jun. 21, 2022

(54) STAIN RELIEF BUSHING

(71) Applicant: ICOTEK PROJECT GMBH & CO. KG, Mogglingen (DE)

(72) Inventors: Bruno Ehmann, Mogglingen (DE); Valentin Ehmann, Schwabisch Gmund (DE)

(73) Assignee: ICOTEK PROJECT GMBH & CO. KG, Mögglingen (DE)

(*) Notice: Subject to any disclaimer, the term of this patent is extended or adjusted under 35 U.S.C. 154(b) by 58 days.

(21) Appl. No.: 16/630,111

(22) PCT Filed: Apr. 6, 2018

(86) PCT No.: PCT/EP2018/058820
§ 371 (c)(1),
(2) Date: Jan. 10, 2020

(87) PCT Pub. No.: WO2019/011485
PCT Pub. Date: Jan. 17, 2019

(65) Prior Publication Data
US 2020/0169072 A1 May 28, 2020

(30) Foreign Application Priority Data
Jul. 13, 2017 (DE) .......................... 102017212009.6

(51) Int. Cl.
*H02G 3/22* (2006.01)
*H02G 15/007* (2006.01)

(52) U.S. Cl.
CPC ............. *H02G 15/007* (2013.01); *H02G 3/22* (2013.01)

(58) Field of Classification Search
CPC ....... H02G 15/007; H02G 15/013; H02G 3/22
See application file for complete search history.

(56) References Cited

U.S. PATENT DOCUMENTS 5,155,303 A    10/1992 Bensel, III et al.
2016/0020592 A1* 1/2016 Beele .................. F16L 5/14
                                              248/56

FOREIGN PATENT DOCUMENTS

CN    104221236 A   12/2014
CN    105308378 A    2/2016
(Continued)

OTHER PUBLICATIONS

International Preliminary Report on Patentability received for PCT Patent Application No. PCT/EP2018/058820, dated Jan. 23, 2020, 15 pages (9 pages of English Translation and 6 pages of Original Document).

(Continued)

*Primary Examiner* — Roshn K Varghese
(74) *Attorney, Agent, or Firm* — Faegre Drinker Biddle & Reath LLP (57) ABSTRACT

The invention relates to a strain relief bushing made of an elastic material for receiving at least one cable
  in at least one axial through-opening which
    is connected to an adjacent through-opening or to an outer side of the strain relief bushing via a slit in such a way as to be openable, wherein
  each of the through-openings has, one behind the other in the axial direction, at least two strain relief portions of different cross-section, wherein
  central axes of the at least two strain relief portions of different cross-section extent in parallel and eccentrically such that the outer circumferences of the at least two strain relief portions of different cross-section are flush with one another along the slit, and wherein
  the strain relief portion having the smallest cross-section of the through-opening accounts for at least 10%, (Continued)

preferably at least 15%, of the axial length of the respective through-opening.

19 Claims, 7 Drawing Sheets

(56) References Cited

FOREIGN PATENT DOCUMENTS

| DE | 10334996 | 2/2005 |
|---|---|---|
| DE | 202012101639 | 8/2013 |
| EP | 0514174 | 11/1992 |
| EP | 1498994 | 1/2005 |
| EP | 2746634 A1 | 6/2014 |
| JP | 2006-248380 A | 9/2006 |
| WO | 2011042128 | 4/2011 |
| WO | 2013/164420 A2 | 11/2013 |
| WO | 2014/124956 A2 | 8/2014 |
| WO | 2016/135928 A1 | 9/2016 |

OTHER PUBLICATIONS

International Search Report and Written Opinion received for PCT Patent Application No. PCT/EP2018/058820, dated Jul. 3, 2018, 17 pages (8 pages of English Translation and 9 pages of Original Document).

Japan Patent Office, Notice of Reasons for Refusal for Japanese Patent Application No. 2020-501241, dated Oct. 25, 2021.

\* cited by examiner

STAIN RELIEF BUSHING

The disclosure relates to a strain relief bushing made of an elastic material for receiving at least one cable in at least one axial through-opening which is connected at least indirectly to an outer side of the strain relief bushing via a slit in such a way as to be openable. The disclosure also relates to a cable pass-through to be preassembled with such strain relief bushings, comprising a frame which is open on one side and a frame cover.

Openable strain relief bushings which are suitable for receiving preassembled cables with plugs or the like are known from the general prior art. These are typically made of an elastic material, for example an elastomer. They can be opened along a slit such that a through-opening is accessible from the side. A cable can thus be inserted in the through-opening, even if for example plugs or the like are arranged on both sides. The strain relief bushing is then closed and encloses the cable in a sealed manner and, if it is compressed, encloses it so tightly that a strain relief of the cable can also be achieved in addition to the sealing effect. The closed strain relief bushing is then inserted for example into a frame or a receiving element and is compressed by closing said frame or receiving element. Intimate contact between the material of the strain relief bushing and the outer sheath of the cable is thus achieved, and at the same time the slit is securely and reliably pressed shut. Very good strain relief is thus possible, along with excellent sealing.

In practice, it is currently the case that reliable strain relief and sealing requires a strain relief bushing that matches the respective cable diameter. Strain relief bushings are therefore available on the market in different diameters, in particular in increments of 1 mm. In practice, the cable that matches the nominal diameter is inserted into the matching strain relief bushing in each case. This ensures good strain relief and sealing. Tolerances within the cable and slight diameter deviations of up to 1 mm can be compensated for by the elastic material, particularly if a sufficient pressing force can be applied when closing a frame that accommodates the strain relief bushing. This applies in particular when said frame consists of frame parts which are screwed to one another during the closing process. In practice, however, deviations of more than 1 mm often lead to insufficient sealing and, particularly if the diameter of the cable is too small compared to the nominal diameter of the strain relief bushing, to a risk of insufficient strain relief of the cable.

One alternative which exists in practice is a floating mounting of cables in a bushing, which serves only to seal a cable entry and does not enable any strain relief or does not enable a strain relief that is sufficient for practical applications. In such constructions, which are disclosed for example in EP 1 498 994 B1, a suitably thin, highly elastic membrane is installed in the through-opening, through which the cable is passed. By virtue of a deformation of the membrane, for example a bending in the running direction of the cable or an elastic deformation of the material of the membrane due to the latter giving way in a manner corresponding to the diameter of the cable, acceptable sealing can be achieved for relatively large diameter ranges of cables. As already mentioned, the problem is on the one hand the strain relief for the cable, which cannot be achieved in practice, and the fact that there is a risk of damage to the membrane if the cable is pulled, so that even the sealing is no longer ensured.

By using regions of different elasticity, for example a lower elasticity in the region of the slit, as is protected in DE 103 34 996 B4, the problem with regard to sealing can be partially counteracted; however, a strain relief relevant for practical purposes cannot be achieved by way of such bushings having a membrane.

The object of the present disclosure is now to further develop a strain relief bushing, as known in principle from the above-described prior art outlined in the introduction, such that it becomes more flexible in terms of use with different diameters. The object of the present disclosure is also to further develop a cable pass-through to be preassembled with such strain relief bushings such that it can be handled particularly easily and efficiently.

This object is achieved by a strain relief bushing having the features in claim 1 and by a cable pass-through having the features in claim 11. Advantageous refinements and developments will emerge from the sub-claims respectively dependent thereon.

Like the strain relief bushings in the prior art, the strain relief bushing according to the disclosure is made of an elastic material. It has at least one through-opening for receiving at least one cable. Said through-opening is connected to an outer side of the strain relief bushing via a slit. To receive multiple cables, multiple through-openings may also be present. Each of said multiple through-openings is connected to an adjacent through-opening via a slit, in such a way as to be openable, and is connected indirectly via said adjacent through-opening to the outer side of the strain relief bushing, or is preferably connected directly to the outer side of the strain relief bushing via the slit. The strain relief bushing will typically have one through-opening, two through-openings located next to one another, or four through-openings which are arranged in a uniformly distributed manner. Ideally, these then each have a slit for opening purposes, said slit extending to the outer side. In the case of two through-openings located next to one another, it is also conceivable, as mentioned, that just one of the through-openings is connected to the outer side via a slit, and this through-opening is then connected to the other adjacent through-opening via a further slit.

According to the disclosure, it is provided that each of the through-openings has, one behind the other in the axial direction, at least two strain relief portions of different cross-section which are arranged eccentrically to one another. According to the disclosure, it is then further provided that the strain relief portion having the smallest cross-section of the through-opening accounts for at least 10%, preferably at least 15%, particularly preferably at least 20%, of the axial length of the respective through-opening. This design of the strain relief portion having the smallest cross-section of the through-opening with a relatively large width of at least 10% of the total thickness of the strain relief bushing or of the corresponding axial length of the respective through-opening ensures that even the region of smallest cross-section is thick enough to ensure, in addition to good sealing, a strain relief that is sufficient in practice. The strain relief portion having the smallest cross-section is therefore deliberately not designed as a type of membrane, but instead has a much larger width than such a membrane would have.

It has been found in practice that, for example in the case of a nominal diameter of the order of 5 mm and a design with at least two strain relief portions of different cross-section, which in the case of the nominal diameter of 5 mm are for example 5 mm in the region of the smallest cross-section and 7 mm in the region of the larger cross-section, it is possible for the strain relief bushing to receive cables in the diameter range from 5 to approximately 8 mm and in doing so to ensure good strain relief on the one hand and very good sealing on the other hand. If, for example, a cable having a nominal diameter of 5 mm is inserted, this will be reliably clamped and sealed in the region of the strain relief portion having the smallest cross-section. An annular gap then remains around the cable in the region of the strain relief portion having the larger cross-section, but this is harmless. If a cable of for example 7 or 8 mm is inserted, then the strain relief portion having the smallest cross-section is able to deform, due to the elasticity of the material, to such an extent that the cable also fits through this strain relief portion. The deformation that occurs will nevertheless be so considerable that reliable sealing between the cable and the strain relief bushing is no longer ensured. However, sufficient sealing is achieved in the region of the other strain relief portion, which in the case of two strain relief portions is ideally located on the opposite surface of the strain relief bushing, so that the imperviousness of the overall structure is still ensured. To prevent the ingress of moisture between the cable and the strain relief bushing, ideally the orientation of the strain relief bushing can be selected during assembly such that the strain relief portion that is more suited to the nominal diameter of the cable faces outwards in each case, in order to reliably ensure the imperviousness in any event.

Compared to the constructions from the prior art, much greater variance of the cable diameters that can be used in one and the same strain relief bushing is possible while still achieving strain relief and imperviousness up to protection class IP65. Instead of providing strain relief bushings in millimetre increments, for example, it is possible to cover a cable diameter range of for example from 2 to 15 mm using just five to seven different strain relief bushings instead of thirteen different strain relief bushings. This considerably reduces the necessary tool costs and the number of strain relief bushings that have to be carried by a worker during installation, which makes the use of the strain relief bushings according to the disclosure very efficient.

In order to seal the abovementioned annular gap, it may additionally be provided that at least one of the through-openings has a sealing lip in the region of at least one of the strain relief portions having one of the larger cross-sections. Such a sealing lip, which does not itself form a strain relief portion, but rather is too thin for this, may also be designed with the small cross-section or with even a somewhat smaller cross-section than that of the strain relief portion having the smallest cross-section. The strain relief and the primary sealing takes place between the strain relief portion having the smaller cross-section, which matches the cable, and the cable. The sealing lip serves only to roughly seal the annular gap, so as to prevent any accumulation of dirt and moisture in the region thereof.

As an alternative to this, however, it would also be conceivable to provide, instead of the sealing lip, a further strain relief portion having the associated necessary width of at least 10%, so that a strain relief portion having a small cross-section is provided on each outer side of the through-opening, with at least one strain relief portion having a larger cross-section being located therebetween.

One highly advantageous development of the concept provides that the at least two strain relief portions of different cross-section are arranged such that they merge directly into one another with their outer circumference on the side that has the slit. They therefore directly follow one another in the axial direction on the side that has the slit. This may in principle take place with a continuous or non-continuous transition, preferably with a substantially linear transition.

The course of the slit both in the axial direction and perpendicular thereto need not be linear; it may also have a wavy or stepped course. However, if it extends linearly in the axial direction, then the strain relief portions of different cross-section may in particular be substantially flush with one another on the side that has the slit.

According to one advantageous development of the strain relief bushing according to the disclosure, it is provided that a transition region is arranged in each case between the at least two strain relief portions of different cross-section, said transition region connecting the adjacent strain relief portions. Such a transition region enables a certain degree of shaping and adaptation. For instance, according to one advantageous development of the concept, said transition region may be designed very simply in the form of a step or a slope on its side remote from the slit. In any case, a linear course of the flush circumferences exists on the side facing the slit, so that in this location there is no geometrically shaped transition region. The step is a very simple design, in particular even in the case of multiple strain relief portions of different cross-sections which follow one behind the other in a stepped manner. In practice, however, this may lead to the situation whereby the material in the transition region is subjected to considerable deformation, which possibly has an adverse effect on the imperviousness. Therefore, it may also be provided that a slope is used instead of a step, which enables better functionality.

According to another very favourable design of the transition region, it may also be provided that the latter is designed as a continuous transition. Such a continuous transition, which extends from the level of one strain relief portion to the level of the other adjacent strain relief portion, can largely prevent the problem of undesirable material deformation. According to another very advantageous design, however, it may also be provided that the transition region is configured such that it is designed as a curve which merges into one strain relief portion in a continuous manner and merges into the other strain relief portion via an edge. Such a design, in which the transition merges in particular into the strain relief portion having the larger cross-section in a continuous manner and into the strain relief portion having the smaller cross-section via an edge, ensures reliable pressing of the strain relief portion having the smaller cross-section against the cable, so that an ideal strain relief is ensured. By means of the transition via an edge, the material of the strain relief portion having the smaller cross-section can easily give way when a cable of large cross-section is inserted. The continuous transition into the cross-section of the other strain relief portion at the same time prevents undesirable deformation of the material in this strain relief portion, so that here a high degree of imperviousness is ensured. This construction, which may have for example an exponential or parabolic curve profile, is therefore a very good compromise between strain relief on the one hand and sealing on the other hand.

According to a further refinement of the concept, it may additionally be provided that each of the through-openings has at least three strain relief portions of different cross-section, said strain relief portions following one another in the axial direction in a manner sorted according to the size of the cross-section. Such a design with three strain relief portions of different cross-sections further increases the flexibility of the strain relief bushing. In the manner described above, reliable sealing can thus be achieved either in the first, in the second or in the third region. The regions follow one another in manner sorted according to the cross-section thereof, in ascending or descending order, so that the region that best matches the diameter of the cable is responsible for the reliable sealing and the other regions, despite very considerable deformation and/or a remaining annular gap, do not adversely affect the functionality of the strain relief bushing.

According to one advantageous refinement of the concept, the elastic material from which the strain relief bushing according to the disclosure can be made is configured with a Shore hardness of up to 100 Shore A, preferably 30 to 90 Shore A. In particular, a material in this Shore hardness range is ideally suited to achieving the described properties and thus to achieving reliable sealing and strain relief for cables with diameter differences of for example 2 to 3 mm in the case of a nominal diameter of the strain relief bushing of for example 5 mm.

When using a strain relief bushing that has just one through-opening, it may be provided according to another highly advantageous refinement of the concept that the central axis of the strain relief portion having the smallest cross-section is arranged centrally in the strain relief bushing. In practice, this means that the strain relief portion(s) having the larger cross-section is correspondingly arranged in a manner offset towards the outside away from the slit. As a result, the material on the side of the strain relief bushing located opposite the slit is correspondingly thinner. The strain relief bushing can thus ideally deform around the circumference of the cable, so that the structure in this case can already be reliably sealed by a correspondingly low pressure.

A cable pass-through to be preassembled with such strain relief bushings comprises a frame which is open on one side and which is substantially U-shaped with one or more chambers separated by intermediate webs, wherein the chambers are designed to accommodate in each case at least one strain relief bushing. The strain relief bushings can be introduced into said frame together with the cables that have been inserted in the openable bushings. The frame, which is substantially U-shaped with one or more chambers located next to one another, is then closed by a frame cover, wherein in the assembled state the at least one strain relief bushing is compressed in the at least one chamber by the frame cover. As the cover is closed, therefore, the structure brings about a compression of the strain relief bushing, namely in a direction perpendicular to the axial direction of the at least one through-hole. As a result, the slit in the strain relief bushing is compressed, so that finally both the sealing of the slit and the sealing of the through-opening around the inserted cable is achieved. The frame cover may for example be screwed onto the frame. Relatively large forces are thus possible when compressing the strain relief bushings, so that good sealing can be achieved even when the cable diameters do not ideally match the nominal diameters of the through-openings.

In practice, it is often difficult to attach the frame cover by screwing, and therefore according to one advantageous development of the concept the frame cover is latched to the frame. The latching of the frame cover and of the frame may preferably take place by means of latching elements which can be connected between the frame and the frame cover by pressing the frame cover onto the frame. Such latching elements, for example latching tongues on the frame cover which engage over the frame in the outer region thereof, are particularly easy and efficient to be able to press the frame cover on by hand and automatically connect it as it is being pressed on. If suitably designed, these latching elements can be raised again, for example by hand or with the aid of a tool such as a small screwdriver or the like, so that the frame cover can also be removed again if necessary.

It has been found in practice that, if the frame cover and the frame are latched together, the force is therefore limited since the frame cover is typically only latched on by hand. The pressing forces for achieving the sealing effect are in this case very much lower than in the case of a frame cover that has been attached by screwing. In particular, even with these relatively low pressing forces due to manual attachment of the frame cover, it is still the case that a sufficient sealing to achieve the relevant protection classes, such as IP65 for example, can be achieved with the inventive design of the strain relief bushings for different cable diameters which in one and the same bushing differ from one another for example by 2 to 3 mm. Ideally, in the assembled state the slits of the strain relief bushings extend parallel to the largest dimension of the frame cover. The frame cover is therefore placed on perpendicularly to the orientation of the slits, in order thus reliably to compress the two mutually facing surfaces of the slits as the frame cover is placed on.

One advantageous development of the concept further provides that the frame cover and the frame have corresponding form-fitting elements, via which the desired width of the frame and/or of the at least one chamber is ensured when connecting the frame cover and the frame. Via such elements which engage in one another with a form fit, for example conical pins and corresponding receiving openings between the frame cover and the frame, it is ensured that a constant width is achieved after assembly. This ensures a relatively uniform distribution of the pressure over the entire longest dimension of the frame cover, so that no bulge remains for example in the middle of the frame and therefore no less pressure acts on the strain relief bushings positioned there than in the edge region, as would be the case if the legs of the U were to extend for example inwards at an angle and the frame cover were thus to be "bent upwards".

Advantageous developments and refinements of the strain relief bushings and/or of the frame provided therewith will emerge from the exemplary embodiments which are described in greater detail below with reference to the figures.

In the figures:

FIGS. 24-26 show strain relief bushings in an alternative embodiment of the cable pass-through;

FIG. 27 shows a strain relief bushing in another alternative embodiment of the cable pass-through; and FIG. 28 shows a strain relief bushing in yet another alternative embodiment of the cable pass-through.

Figure 1:
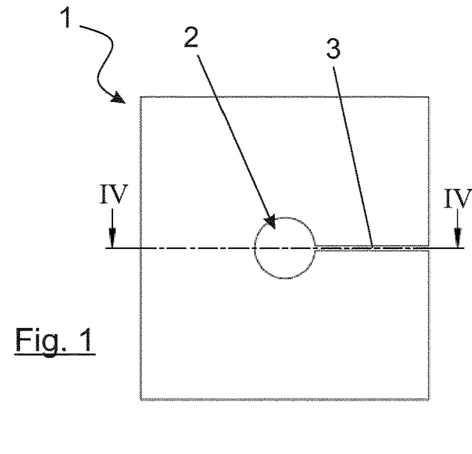
FIGS. 1-4 show a possible embodiment of a strain relief bushing according to the disclosure with one through-opening, in a view from three sides and in a sectional view.
Figure 2:
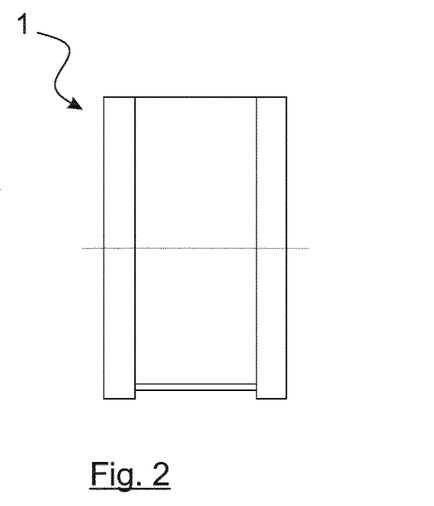
Figure 3:
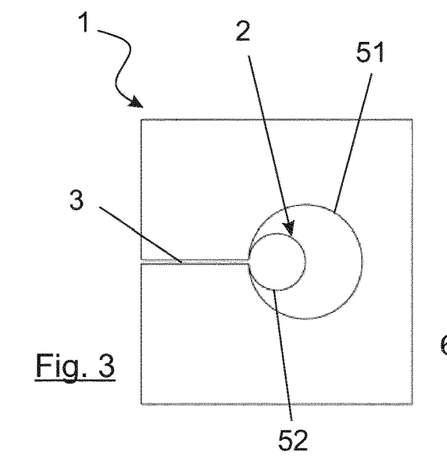
Figure 4:
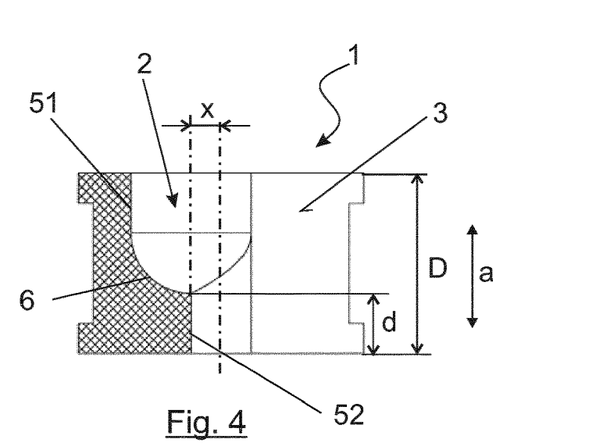

A strain relief bushing 1 can be seen in a front view in the illustration of FIG. 1. A side view can be seen in the illustration of FIG. 2, and a rear view of the same strain relief bushing 1 can be seen in the illustration of FIG. 3. FIG. 4 shows a section along the line IV-IV in FIG. 1. The strain relief bushing 1 shown here has one through-opening, labelled 2, for receiving a cable. The through-opening is connected to one of the outer sides 4 of the strain relief bushing 1 via a slit, labelled 3. The strain relief bushing 1, which is intended to be made of an elastomeric material having a Shore hardness of the order of up to 100 Shore A, preferably 30 to 90 Shore A, can thus be opened along the slit 3 in order to be able to insert into the through-opening 2 even preassembled cables 20, not shown in FIGS. 1 to 4, that is to say cables 20 which already carry a plug or the like. The strain relief bushing 1 with an inserted cable 20 is then typically compressed in a frame 8 or a receiving element in order to achieve, on the one hand, strain relief of the cable 20 in the through-opening 2 and, on the other hand, reliable sealing. This is known in principle from the prior art and will be described later in the explanation of FIG. 19 ff. in relation to the use of a frame 8 containing such strain relief bushings. The strain relief bushing 1, which is mainly shown here in the shape of a rectangle or square, may also have any other outer contour, and similarly the through-opening 2 need not be circular, as can be seen purely by way of example in FIG. 25.

The illustration of FIG. 4 shows a section along the line IV-IV in FIG. 1. This section shows the through-opening 2 which exhibits a first strain relief portion, labelled 51, having a first cross-section and a second strain relief portion, labelled 52, having a second cross-section that is smaller than the cross-section of the strain relief portion 51. The central axes of the cross-sections of the through-opening 2 or of the strain relief portions 51, 52 thereof, said cross-sections being round here by way of example, extend parallel and eccentrically to one another and are thus spaced apart from one another here by the distance x. The respective outer diameters lie on top of one another in the region of the slit 3, as can be clearly seen in particular in the sectional illustration and also in the view shown in FIG. 3. A transition region, labelled 6, extends between the two strain relief portions 51, 52. In the exemplary embodiment shown here, this transition region is formed by a curve which merges continuously and steadily into the strain relief portion 51 and which is connected to the strain relief portion 52 via an edge. Due to the design with the outer circumferences of the strain relief portions 51, 52 of the through-opening 2 touching one another on the line of the slit 3, this transition region 6 changes in the direction of the slit 3 and increasingly comes closer to the shape there of a continuous straight transition between the two strain relief portions 51, 52.

The strain relief portion 52 having the smallest cross-section of the through-opening 2 has a certain proportion of the axial length of the total through-opening 2. This axial length of the total through-opening 2 corresponds to the thickness of the strain relief bushing 1 in the axial direction a, which is labelled D in the illustration of FIG. 4. The proportion of the axial length d of the strain relief portion 52 having the smallest cross-section in relation to this total axial length, that is to say the thickness D of the strain relief bushing 1, should be more than 10%, preferably more than 15%, particularly preferably more than 20%. The ratio d/D is thus at least 0.1. In the illustration of FIG. 4, this ratio is approximately 0.35, and the strain relief portion 52 having the smallest cross-section therefore accounts for approximately 35% of the axial total length D of the through-opening 2. This value must be suitably adapted as a function of the Shore hardness of the material, which is preferably of the order of 30 to 90 Shore A. Ultimately, this value also depends on the two cross-sections of the strain relief portions 51, 52. As in the exemplary embodiment shown above, these may be for example 5 mm on the one hand and 7 mm on the other hand, in order to receive cables between 5 and 8 mm in diameter in a secure, sealed and strain-relieved manner in the strain relief bushing 1.

This special design of the through-opening 2 of the strain relief bushing 1 now makes it possible for cables 20 having a diameter that matches the cross-section of the strain relief portion 52 of the through-opening 2 to be accommodated just as securely, reliably and tightly as cables 20 that match the cross-section of the strain relief portion 51 of the through-opening 2. In the case of the thinner cable 20, the strain relief portion 52 comes to bear sealingly against the cable 20 and ensures a sealing and at the same time a reliable strain relief of the cable 20, due to the relatively large contact area. In the strain relief portion 51, the strain relief bushing 1 does not touch the cable 20. In practice, it is therefore advisable to install the strain relief bushing 1 with the cable 20 such that the side of the strain relief bushing 1 adjoined by the strain relief portion 52 is directed towards the region to be sealed, so that liquid cannot even penetrate into the region of the strain relief bushing 1. When using a larger cable 20 up to the diameter of the strain relief portion 51 of the through-opening 2, exactly the opposite is the case.

Figure 5:
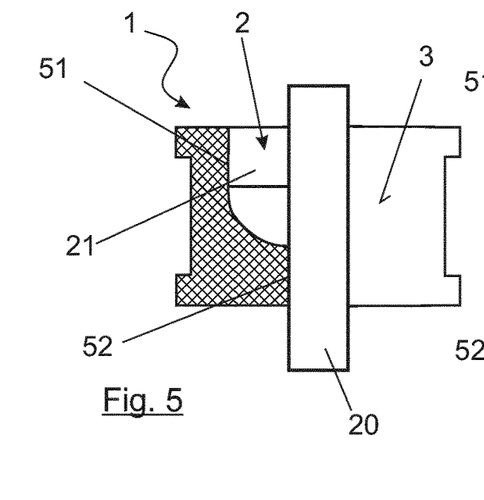
FIGS. 5 and 6 show a schematic illustration analogous to FIG. 4 with inserted cables of different diameter.
Figure 6:
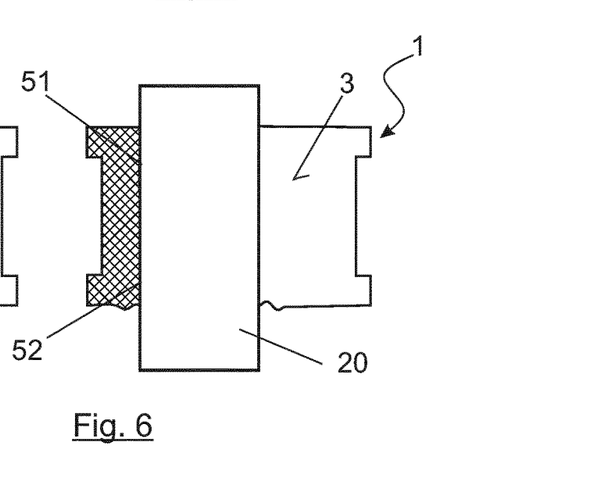

This is shown schematically in the two FIGS. 5 and 6. The structure is substantially that of FIG. 4. In the illustration of FIG. 5, a cable for example having a diameter of 5 mm is inserted. The strain relief portion 52 seals this cable 20 with respect to the surrounding environment as soon as the strain relief bushing 1 is suitably compressed, and at the same time ensures good strain relief An annular gap, labelled 21 here, remains between the strain relief portion 51 and the cable 20. In the illustration of FIG. 6, a larger cable, for example having a diameter of 7 mm, is inserted into the same strain relief bushing 1. Here, the strain relief portion 52 is very considerably deformed, as is indicated in the illustration of FIG. 6. This possibly also concerns the slit 3 in the axial region of the strain relief portion 52. This is indicated here by the correspondingly deformed surface contour of the strain relief bushing 1. Such a contour no longer ensures reliable sealing, but it can normally ensure strain relief. The reliable sealing and also strain relief is ensured here in the region of the strain relief portion 51, the cross-section of which matches the diameter of the cable 20, so that tight contact can be achieved here. Ideally, the structure will in this case be installed such that the tight side faces outwards, for example when installed in a control cabinet, in order thus to safely and reliably prevent the ingress of liquid between the cables 20 and the strain relief bushing 1.

Figure 7:
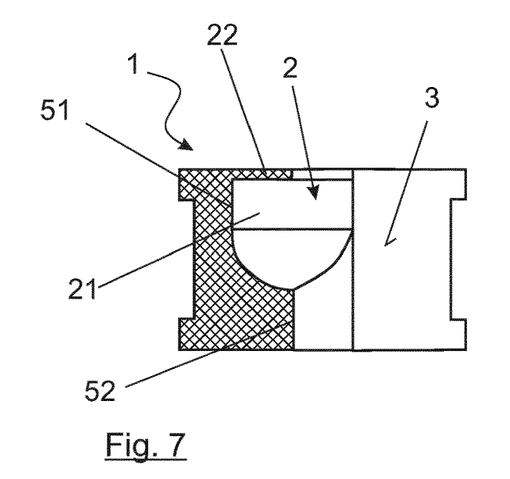
FIG. 7 shows an alternative possible embodiment of a strain relief bushing according to the disclosure, in a sectional view analogous to that in FIG. 4.

The variant in FIG. 7 shows another possible embodiment. As discussed in FIG. 5, when a cable 20 having a small diameter is inserted, this leads to the annular gap 21 around the cable 20 in the region of the strain relief portion 51 having the larger cross-section. In order to seal this annular gap 21, a sealing lip 22 may be provided, said sealing lip likewise having the small open cross-section or a somewhat smaller open cross-section than that of the strain relief portion 52 having the smallest cross-section. In the embodiment shown in FIG. 7, this sealing lip 22 does not transmit any forces. In a manner analogous to the illustration in FIG. 5, the strain relief and the primary sealing take place between the strain relief portion 52 and the cable 20. The sealing lip 22 serves only to seal the annular gap 21 in order to prevent any accumulation of relatively coarse dirt and moisture in the region thereof.

As an alternative to this, however, it would also be conceivable to provide, instead of the sealing lip 22, a further strain relief portion 53 having the width of d>0.1D that is necessary for this purpose.

Figure 8:
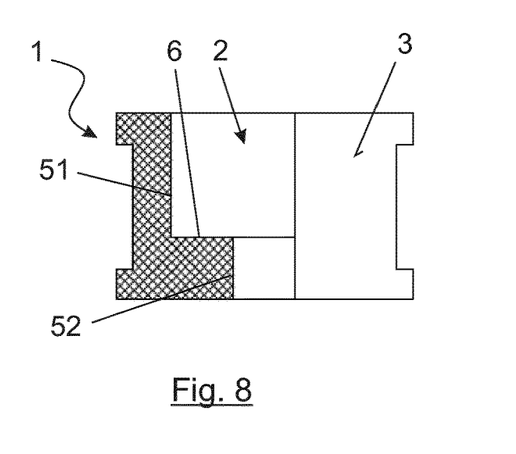
FIGS. 8-13 show further different designs of the through-opening.
Figure 9:
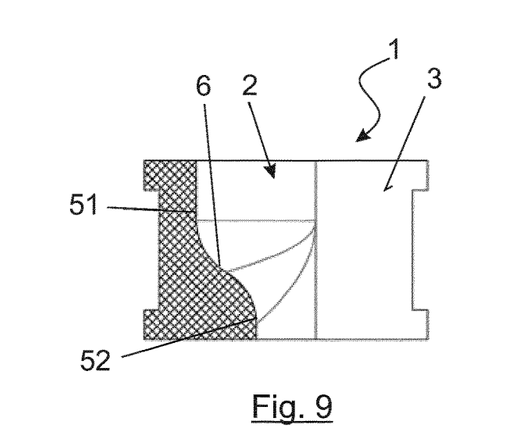
Figure 10:
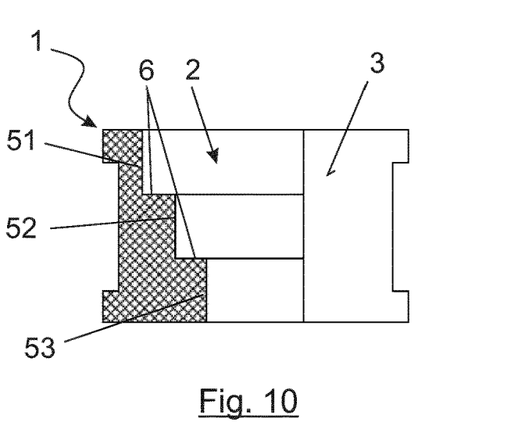
Figure 11:
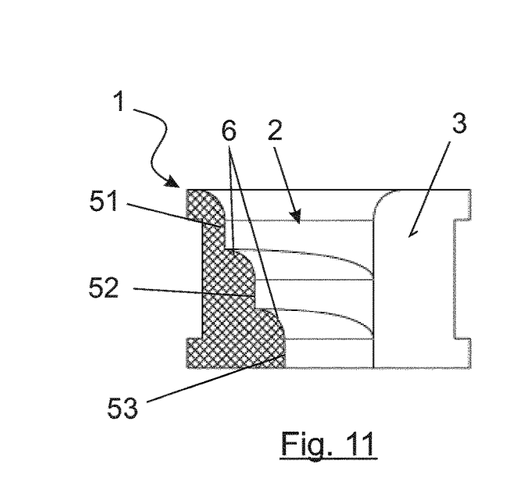
Figure 12:
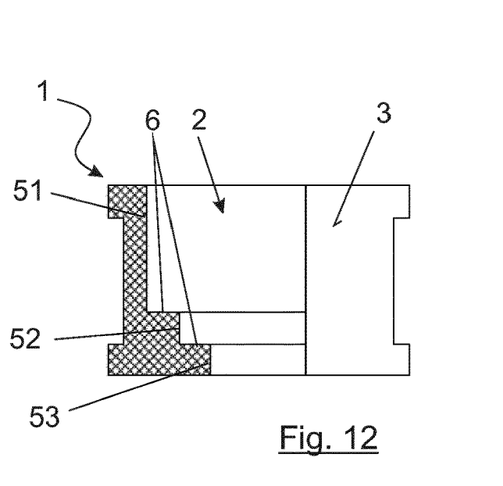
Figure 13:
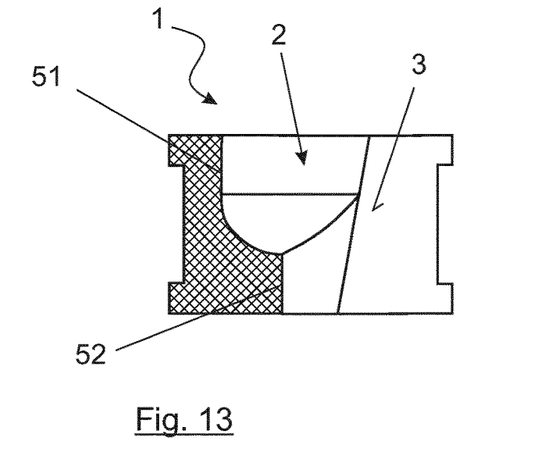
Figure 14:
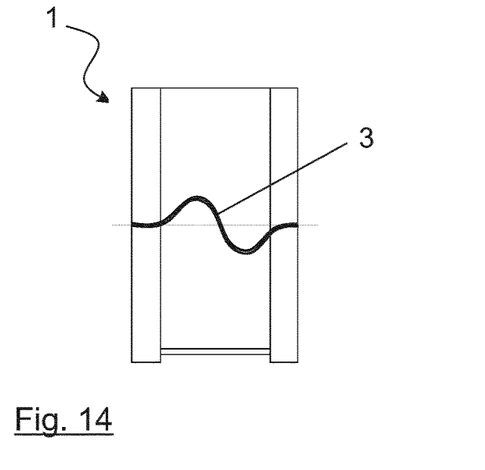
FIG. 14 shows an alternative embodiment of a strain relief.

FIGS. 8 to 14 show alternative embodiments of the inner contour of the through-opening 2. The illustration of FIG. 8 shows a very simple variant with a step between the strain relief portion 51 and the strain relief portion 52. The illustration of FIG. 9 shows a continuous transition between the strain relief portions 51 and 52. The illustration of FIG. 10 again shows a stepped structure, in which three different strain relief portions 51, 52, 53 are arranged in descending order of cross-section. This makes it possible to reliably receive three different cable diameters. The illustration of FIG. 11 shows a similar structure with three strain relief portions 51, 52, 53, wherein the transitions here are configured similarly to those in the illustration of FIG. 4 but in principle the other way round, namely with a continuous transition to one strain relief portion and an edge at the transition to the other strain relief portion. Also shown here is a kind of introduction phase between the first strain relief portion 51 and the edge of the strain relief bushing 1. This enables reliable sealing even in the case of yet larger cable diameters. The illustration of FIG. 12 once again shows an illustration in a stepped structure. In a manner differing from the illustration of FIG. 8, the structure is selected such that the steps in the axial direction of the through-opening 2 are split into two small strain relief portions 52, 53 and one correspondingly large or long strain relief portion 51. FIG. 13 shows a further variant with a side edge extending at an angle to a central axis of the through-opening 2 on the side that has the slit 3. Other shapes deviating from the linear course are also conceivable in addition, which serve in particular to simplify manufacture by injection moulding, for example an easy kink or the like resulting from draft angles. FIG. 14 shows, in a side view, a non-linear course of the slit 3 in the axial direction a. Besides the course shown here with a wavy shape, one or more steps or the like would also be conceivable.

Figure 15:
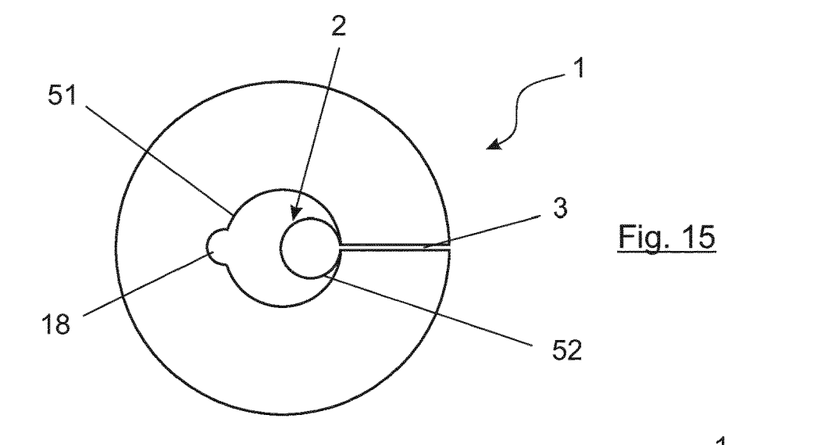
FIGS. 15-20 show another alternative embodiment of a strain relief bushing with four through-openings.

Finally, FIG. 15 shows a variant of the strain relief bushing 1 with an outer contour differing from a rectangular or square outer contour, in this case a round contour. In a manner analogous to the illustration in FIG. 3, the through-opening 2 is shown from the side of the strain relief portion 51 having the larger cross-section. FIG. 15 shows a variant with a cross-sectional contour of the strain relief portion 51 that deviates from the round shape. Here, the cross-sectional contour of the strain relief portion 51 having the larger cross-section has an indentation 18 for example on the side thereof remote from the slit 3. Other contours, for example oval, polygonal or the like, are also conceivable. The other of the strain relief portions 52 is shown here by way of example with a round cross-sectional contour, but a deviation from this would also be conceivable here. However, the deviating contour is particularly helpful in the region of the strain relief portion 51 having the larger cross-section, since it enables the material of the strain relief bushing 1 to "flow" better around the larger cable and thus enables greater differences in cross-sections.

Figure 16:
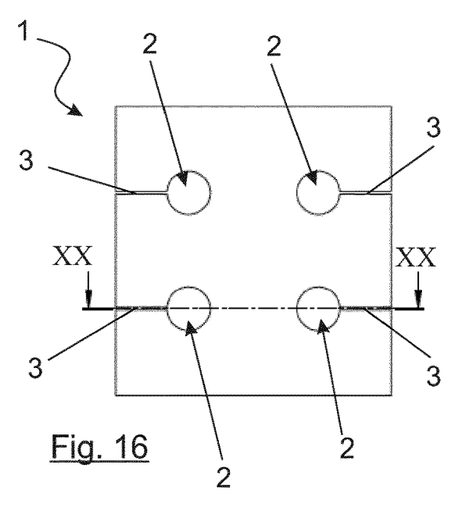
Figure 17:
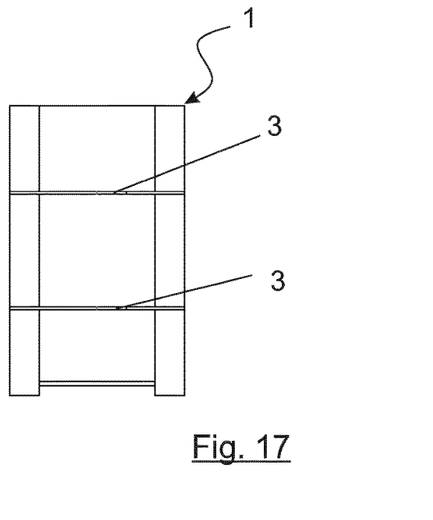
Figures 18, 19:
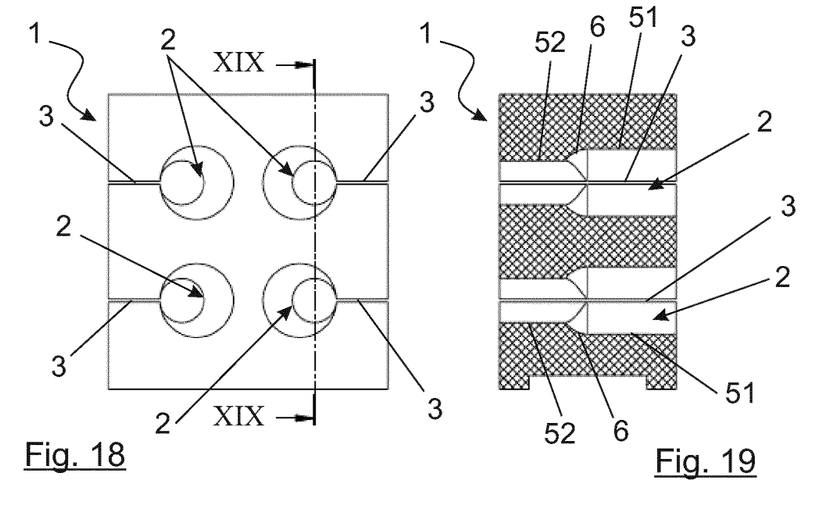
Figure 20:
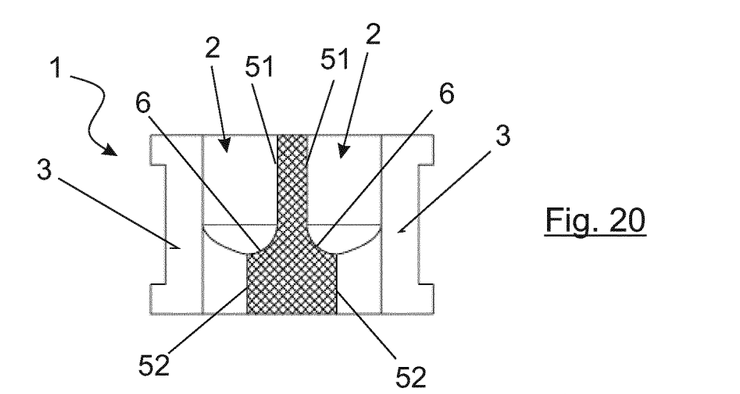

FIG. 16 shows an alternative embodiment of a strain relief bushing 1 with four through-openings 2, in a manner substantially analogous to the illustration of FIGS. 1 to 4, with an additional section XIX-XIX from FIG. 16 in the illustration of FIG. 19. Here, each of the through-openings 2 is designed in a manner analogous to the through-opening shown in FIG. 4. In principle, all variants of the inner contour as described in FIGS. 7 to 13 and 15 would of course also be conceivable here. As an alternative to the embodiment shown here, in which each of the through-openings 2 has its own slit 3 to an outer side 4 of the strain relief bushing 1, a structure would also be conceivable in which for example the two right-hand through-openings 2 in the illustration of FIG. 13 would be connected to the two left-hand through-openings 2 in the illustration of FIG. 16 via a slit, and said left-hand through-openings would then be connected to the outside via the slit 3.

Figure 21:
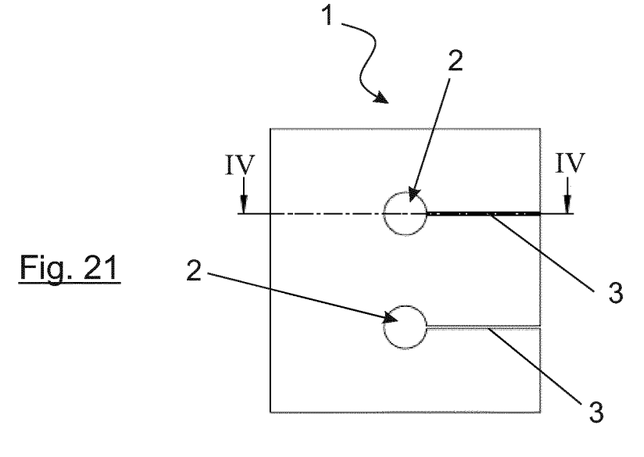
FIG. 21 shows another alternative design with two through-openings.

The illustration of FIG. 21 shows a further alternative of the strain relief bushing 1. The section along the line IV-IV in the illustration of FIG. 21 corresponds in its view to the section shown in FIG. 4. Here, too, the design may be analogous to what has been stated in FIGS. 7 to 13 and 15.

Figure 22:
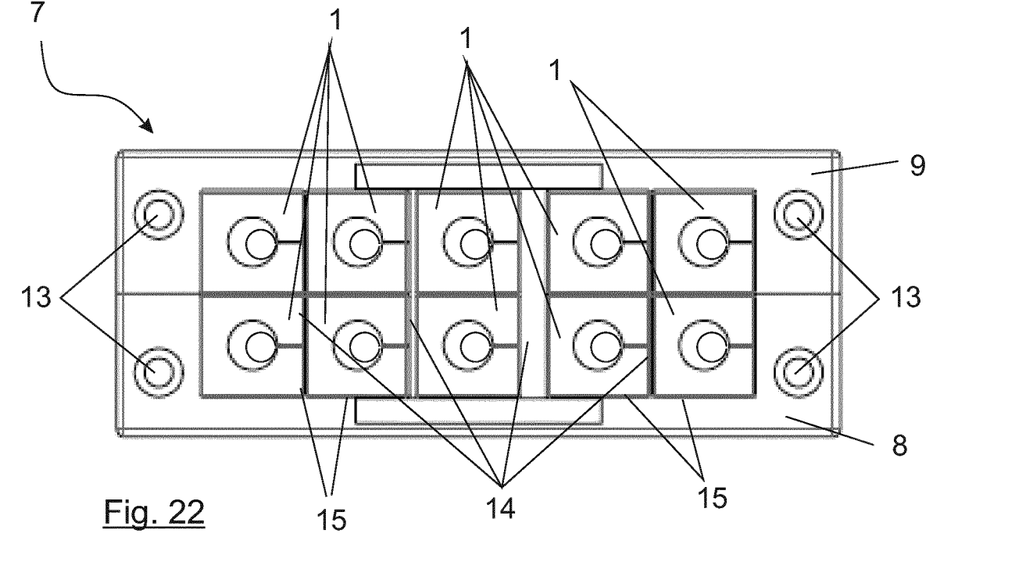
FIGS. 22 and 23 show strain relief bushings in a cable pass-through for installation on a control cabinet, in a first embodiment.
Figure 23:
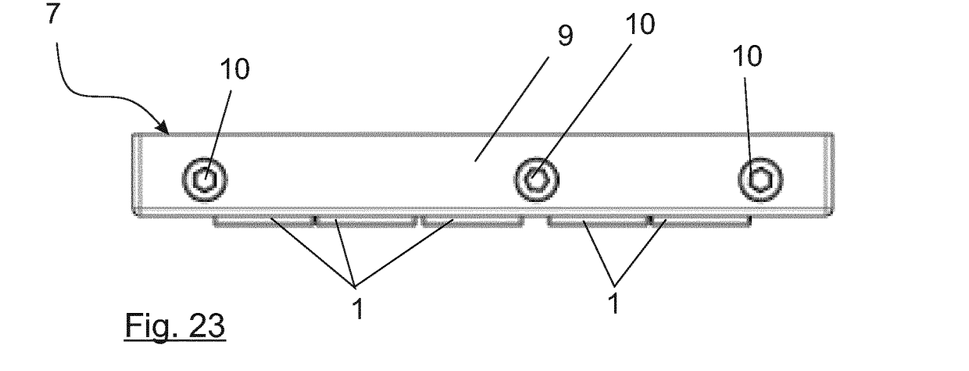

A cable pass-through 7 can be seen in a front view in FIG. 22 and in a plan view in FIG. 23. In the exemplary embodiment of FIG. 22, it consists of a lower frame 8 and of a largely identically shaped frame cover 9, each of these being U-shaped. Individual chambers 15 in the frame 8, and here also in the frame cover 9, are formed by intermediate webs 14. The strain relief bushings 1 with the cables 20 (not shown here) are arranged in these chambers 15. Depending on requirements, different strain relief bushings 1, for example in the above-described variant embodiments, can be inserted in the chambers 15, which have in their width a grid size corresponding to one of the strain relief bushings 1 and which can receive in their height for example in each case 2 of the strain relief bushings 1. In the assembled state, the cable pass-through 7 is designed to be screwed to the wall of a control cabinet (not shown) via holes 13 on the side parts of the frame 8 and/or of the frame cover 9. In the illustration of FIG. 22, ten individual strain relief bushings 1, each having a through-opening 2, are inserted in the cable pass-through 7 in a view analogous to that in FIG. 3. As can be seen in the illustration of FIG. 22, the frame 8 and the frame cover 9 of the cable pass-through 7 are screwed to one another by three screws 10 in order to apply the necessary pressing force for sealing and strain relief to the strain relief bushings 1 and to the cables 20 located in the through-openings 2, said cables not being shown here.

Figures 24, 25, 26:
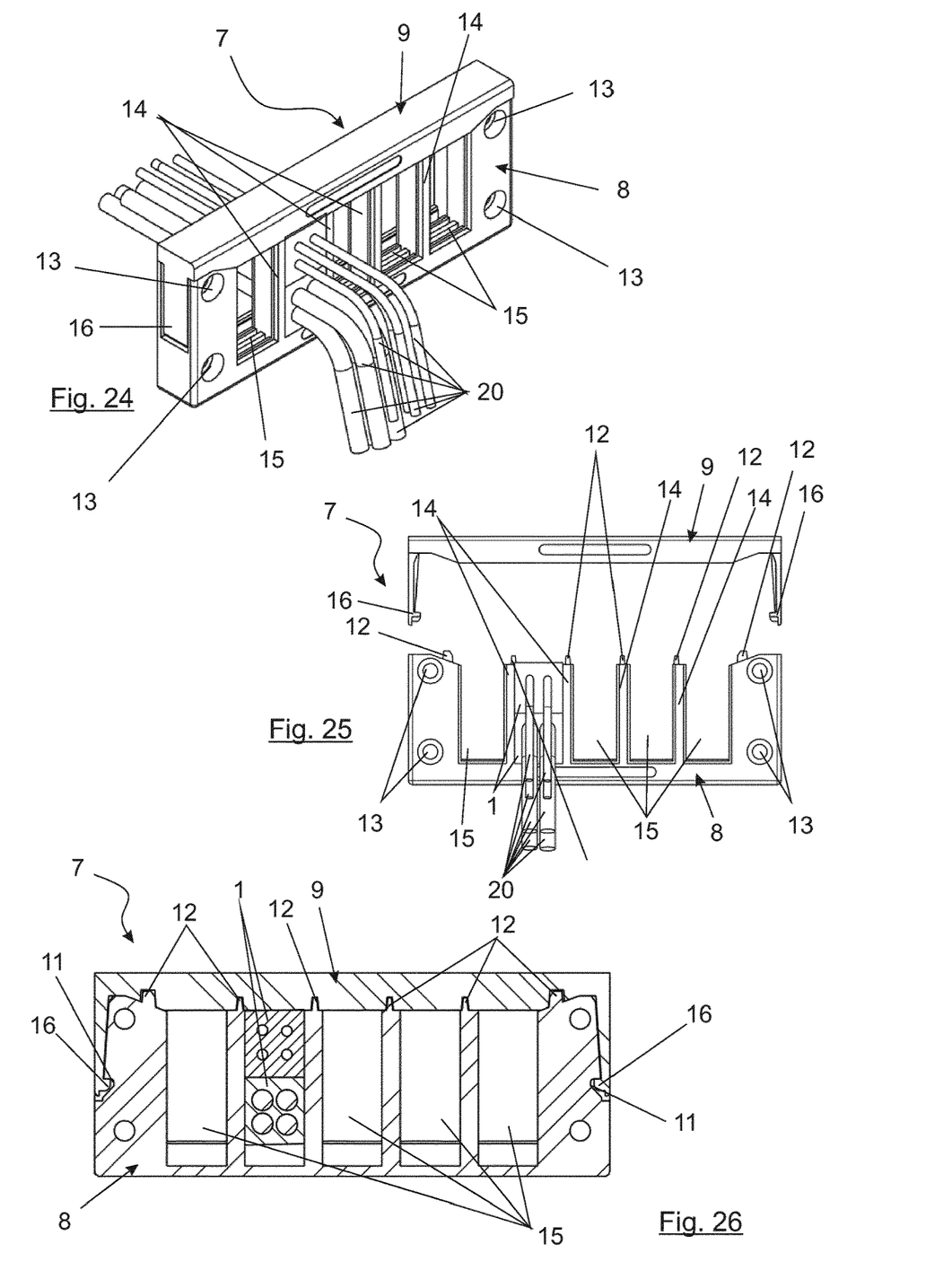

FIG. 24 shows an alternative embodiment of such a cable pass-through 7. The three-dimensional view shows only two of the strain relief bushings 1 in a variant embodiment analogous to the illustration in FIGS. 16 to 20. These are arranged in one of the chambers 15, and the remaining chambers 15 are left empty here for the sake of better visibility.

Here, too, the cable pass-through 7 consists of a frame 8 and a frame cover 9, which in this variant is flat. The frame 8 is substantially U-shaped and has five individual chambers 15, which once again are separated from one another by the intermediate webs 14, and which have in their width a grid size corresponding to one of the strain relief bushings 1, in a manner comparable to the frame in the illustration of FIG. 22. Since two of the strain relief bushings 1 with their cables 20 are inserted here one above the other in just one of the chambers 15, the chambers 15 can be seen very clearly here compared to the illustration in FIG. 22. In the front view of FIG. 25, the same structure is shown in the open state. The frame cover 9 has two latching hooks 16 which grip around the sides of the actual frame 8, as can also be seen in the three-dimensional view of FIG. 24. Once the strain relief bushings 1 have been inserted, wherein here in practice all the chambers 15 of the frame 8 are filled with the strain relief bushings 1 or with corresponding blind bushings for sealing purposes, the frame cover 9 merely has to be pressed on by hand so that the frame cover 9 latches in. This can be seen in the sectional illustration of the closed cable pass-through 7 in FIG. 26. The latching hooks 16 of the frame cover 9 are seated in corresponding recesses 11 and are latched to the latter. In order to stabilize the width of the frame 8 once the frame cover 9 has been placed on, multiple elements 12 which engage in one another in a form-fitting manner are additionally provided. This ensures that the width of the frame 8 corresponds in each case to the desired width after the frame cover 9 has been installed, and that the width of the individual chambers 15 within the frame 8 and between the intermediate webs 14 is reliably kept in the predefined width. This is particularly important because the strain relief bushings 1 are correspondingly compressed by the frame cover 9. Different widths of the individual chambers 15 due to deformations would lead to different pressures on the strain relief bushings 1 and thus would impair the sealing effect. In order to prevent this, conical pins and corresponding conical bores in the counterpart may be provided for example as corresponding form-fitting elements 12. This ensures that the width on the one hand of the individual chambers 15 separated by the intermediate webs 14 and on the other hand of the frame 8 as a whole remains constant, so that a uniform pressure can be exerted by the frame cover 9 on the strain relief bushings 1 located in the respective chambers 15, in order to seal these evenly across the entire structure.

Irrespective of this, different grid sizes of the chambers 15 in terms of width are of course conceivable within a frame 8 containing the respectively suitable strain relief bushings 1.

Figure 27:
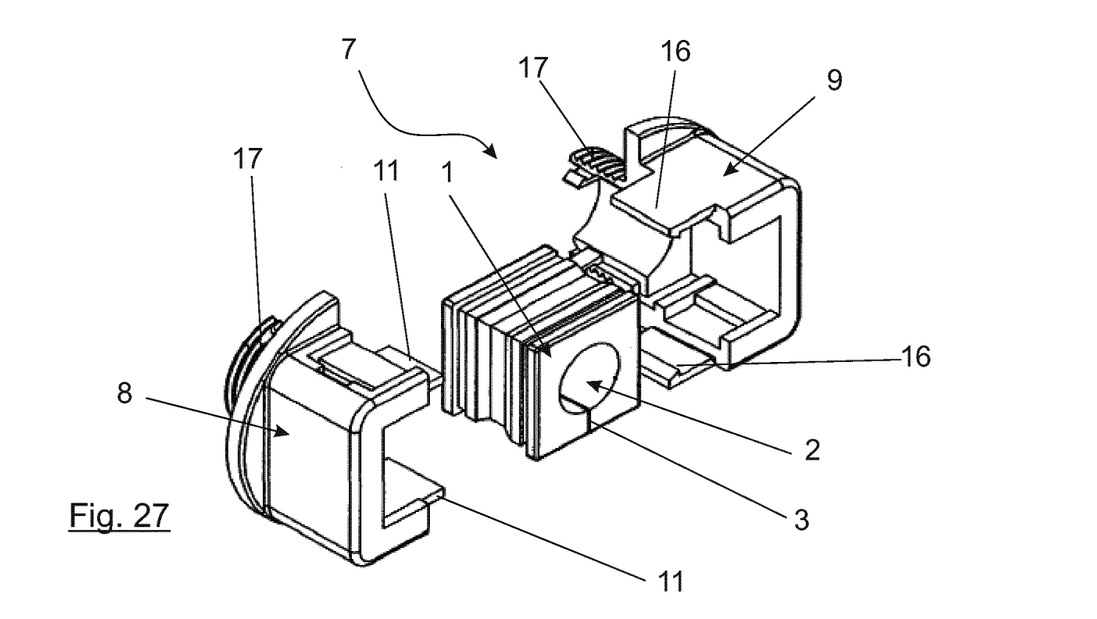

The illustration of FIG. 27 shows another variant of the cable pass-through 7 comprising the frame 8 and the frame cover 9, here for accommodating just one of the chambers 15 and one of the strain relief bushings 1. The frame 8 and the frame cover 9 are again designed in a very similar manner and each encompass the strain relief bushing 1 along a portion of its outer sides, here in each case along half purely by way of example. They are latched to one another via two latching hooks 16, but a screwed design would also be conceivable. The assembled combination of frame 8 and frame cover 9 together with the strain relief bushing 1 and the inserted cable 20, which is not shown here, is then passed through an opening, for example in a control cabinet, and is screwed via a nut (not shown here) and a thread 17.

Figure 28:
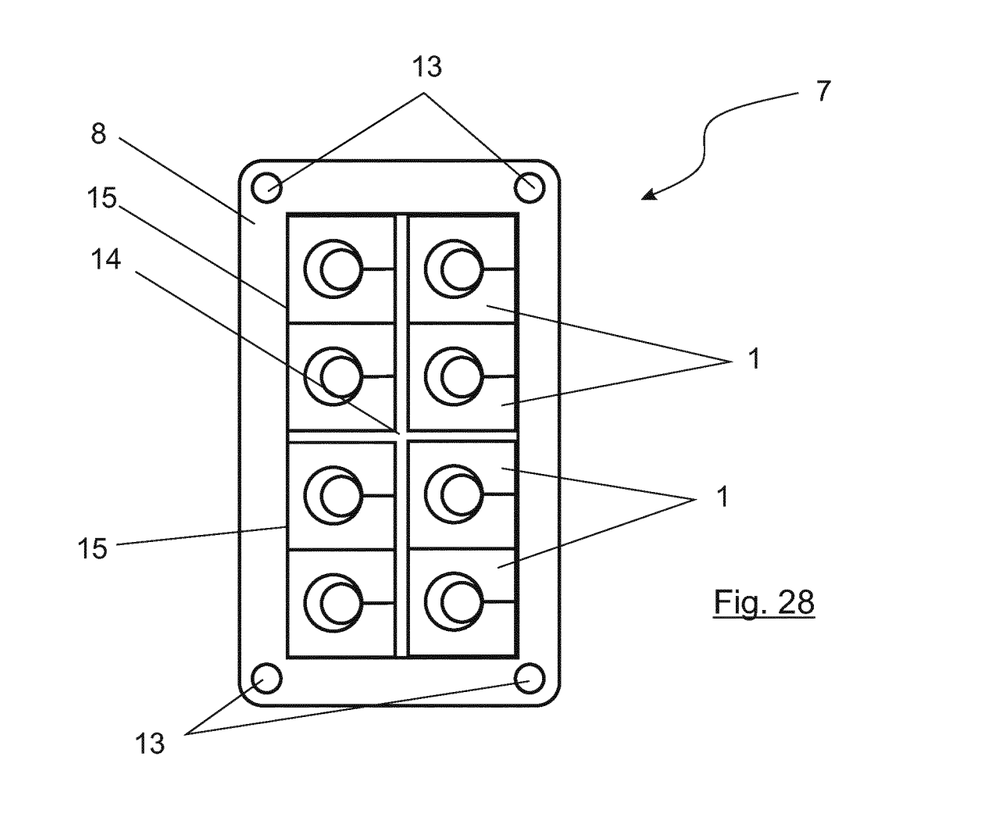

Finally, FIG. 28 shows a cable pass-through 7 in which the frame 8 is formed in one piece and is not open on one side. The chambers 15 are also formed here by a cross-shaped intermediate web 14. The cables 20 (not shown here) can thus be passed through the frame 8. The intermediate web 14 is then inserted and/or the strain relief bushings 1 are placed around the cable 20. These are then pushed into the frame 8 in the axial direction a, possibly together with the intermediate web 14, and are held therein by a force fit and/or a form fit.

All the variants from the different exemplary embodiments can of course be combined with one another at will. Also conceivable for example is a cable pass-through 7 with a round chamber 15, or a cable pass-through analogous to FIG. 27 with a one-piece frame, etc. The deviation in the shape of the through-opening 2 in the case of a rectangular or square strain relief bushing 1 can also be correspondingly combined with all the variants shown in FIGS. 4 to 21, and these variants can also be combined with one another, and so on.

The invention claimed is:

1. A strain relief bushing comprising an elastic material for receiving at least one cable
   in at least one axial through-opening which
   is connected to at least one of an adjacent through-opening and an outer side of the strain relief bushing via a slit in such a way as to be openable, wherein
   the at least one axial through-opening has, one behind the other in the axial direction, at least two strain relief portions of different cross-section, wherein
   the at least two strain relief portions of different cross-section are arranged eccentrically to one another,
   wherein the at least one axial through-opening and the adjacent through-opening are arranged eccentrically to each other,
   the strain relief portion having the smallest cross-section of the through-opening accounts for at least 10% of the axial length of the respective at least one axial through-opening,
   wherein the outer circumference of the at least two strain relief portions of different cross-section directly adjoin one another along the slit so that the outer circumferences of the strain relief portions of the through-opening touch one another on the line of the slit in the form of a continuous straight transition; and
   wherein an inner wall of the at least one axial through-opening towards the slit and within a first strain relief portion of the at least two strain relief portions and an inner wall of the adjacent through-opening towards the slit and within a second strain relief portion of the at least two strain relief portions are collinear.

2. The strain relief bushing according to claim 1, wherein a transition region is arranged between the at least two strain relief portions of different cross-section, said transition region connecting the adjacent strain relief portions.

3. The strain relief bushing according to claim 2, wherein the transition region is designed in the form of a step or a slope on the side remote from the slit, as seen in cross-section through the through-opening.

4. The strain relief bushing according to claim 3, wherein each of the through-openings has at least three strain relief portions of different cross-sections, said strain relief portions following one another in the axial direction in a manner sorted according to the size of the cross-sections.

5. The strain relief bushing according to claim 2, wherein the transition region is designed as a continuous transition on the side remote from the slit, as seen in cross-section through the through-opening.

6. The strain relief bushing according to claim 5, wherein each of the through-openings has at least three strain relief portions of different cross-sections, said strain relief portions following one another in the axial direction in a manner sorted according to the size of the cross-sections.

7. The strain relief bushing according to claim 2, wherein the transition region is designed as a curve on the side remote from the slit, as seen in cross-section through the through-opening, which curve merges into one strain relief portion in a continuous manner and merges into the other strain relief portion via an edge.

8. The strain relief bushing according to claim 2, wherein each of the through-openings has at least three strain relief portions of different cross-sections, said strain relief portions following one another in the axial direction in a manner sorted according to the size of the cross-sections.

9. The strain relief bushing according to claim 1, wherein the at least one axial through-opening has at least three strain relief portions of different cross-sections, said strain relief portions following one another in the axial direction in a manner sorted according to the size of the cross-sections.

10. The strain relief bushing according to claim 1, wherein the elastic material has a Shore hardness of less than 100 Shore A.

11. The strain relief bushing of claim 10, wherein the elastic material has a Shore hardness of 30 to 90 Shore A.

12. The strain relief bushing according to claim 1, wherein the at least one axial through-opening has a sealing lip in the region of at least one of the strain relief portions having one of the larger cross-sections.

13. The strain relief bushing according to claim 1 having precisely one through-opening, wherein the central axis of the strain relief portion having the smallest cross-section is arranged centrally in the surface of the strain relief bushing that is perpendicular to the axial direction.

14. A cable pass-through to be preassembled with strain relief bushings according to claim 1, comprising a frame which is designed with one or more chambers separated by intermediate webs, wherein the chambers are designed to accommodate in each case at least one strain relief bushing.

15. The cable pass-through according to claim 14, wherein the frame is open on one side and is substantially U-shaped, and with a frame cover for closing the U-shaped frame, wherein in the assembled state the at least one strain relief bushing is clamped in the at least one chamber by the frame cover.

16. The cable pass-through according to claim 15, wherein in the assembled state the slits of the strain relief bushings extend parallel to the largest dimension of the frame cover.

17. The cable pass-through according to claim 15, wherein in the assembled state the frame cover is latched to the frame via latching elements.

18. The cable pass-through according to claim 15, wherein the frame cover and the frame have corresponding form-fitting elements, via which the desired width of the frame and/or of the at least one chamber is ensured when connecting the frame cover and the frame.

19. The strain relief bushing of claim 1, wherein the first strain relief opening portion accounts for at least 15% of the axial length of the at least one axial through-opening.

* * * * *